(12) United States Patent
Lin

(10) Patent No.: US 9,860,500 B2
(45) Date of Patent: Jan. 2, 2018

(54) PROJECTOR DEVICE, PORTABLE DEVICE AND WEARABLE PROJECTOR SYSTEM

(71) Applicant: Chiun Mai Communication Systems, Inc., New Taipei (TW)

(72) Inventor: Yen-Wei Lin, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 192 days.

(21) Appl. No.: 14/861,018

(22) Filed: Sep. 22, 2015

(65) Prior Publication Data

US 2016/0269703 A1     Sep. 15, 2016

(30) Foreign Application Priority Data

Mar. 10, 2015   (CN) .......................... 2015 1 0103866

(51) Int. Cl.
| | |
|---|---|
| *G09G 5/00* | (2006.01) |
| *H04N 9/31* | (2006.01) |
| *G02C 11/00* | (2006.01) |
| *G06F 3/14* | (2006.01) |
| *G09G 5/12* | (2006.01) |
| *G09G 3/00* | (2006.01) |

(52) U.S. Cl.
CPC ........... *H04N 9/3185* (2013.01); *G02C 11/10* (2013.01); *G06F 3/1423* (2013.01); *G09G 3/002* (2013.01); *G09G 5/12* (2013.01); *H04N 9/3173* (2013.01); *G09G 2340/0464* (2013.01); *G09G 2360/141* (2013.01); *G09G 2370/06* (2013.01); *G09G 2370/16* (2013.01)

(58) Field of Classification Search
None
See application file for complete search history.

(56) References Cited

U.S. PATENT DOCUMENTS

| | | | |
|---|---|---|---|
| 7,695,155 B1* | 4/2010 | Hou ..................... | F21V 21/30 351/158 |
| 2006/0038927 A1* | 2/2006 | Saletta .................... | H04N 5/74 348/745 |
| 2006/0187421 A1* | 8/2006 | Hattori .................... | H04N 5/74 353/69 |

(Continued)

FOREIGN PATENT DOCUMENTS

| | | |
|---|---|---|
| CN | 203414681 U | 1/2014 |
| CN | 103974048 A | 8/2014 |
| CN | 103995592 A | 8/2014 |

*Primary Examiner* — Anh-Tuan V Nguyen
(74) *Attorney, Agent, or Firm* — ScienBiziP, P.C.

(57) ABSTRACT

A wearable projector system includes a projector device and a portable device communicated with the projector device. The wearable projector system includes at least one signal generator, a projector and a control unit. The signal generator transmits wireless signals. The projector outputs projection contents. The portable device includes a plurality of sensors and an operation unit. The sensors detect a position of the signal generator and generate a position signal. The operation unit determines an adjustment displacement of the projector device according to the position signal and generates an adjustment displacement signal representing a displacement between the projector device and the portable device. The control unit adjusts a projecting direction and a projected frame shape of the projector according to the adjustment displacement signal.

13 Claims, 3 Drawing Sheets

(56) References Cited

U.S. PATENT DOCUMENTS

| | | | | |
|---|---|---|---|---|
| 2007/0097324 A1* | 5/2007 | Kikuchi | ............. | G02B 27/0172 353/46 |
| 2010/0188587 A1* | 7/2010 | Ashley | ................... | H04N 5/74 348/744 |
| 2011/0304557 A1* | 12/2011 | Wilburn | ................ | G06F 3/0488 345/173 |
| 2013/0050206 A1* | 2/2013 | Willis | .................. | G06F 1/1637 345/419 |
| 2014/0039674 A1* | 2/2014 | Motoyama | ............ | G03B 21/142 700/245 |
| 2014/0068520 A1* | 3/2014 | Missig | ................. | G06F 3/0482 715/841 |
| 2014/0176417 A1* | 6/2014 | Young | .................... | G06F 1/163 345/156 |
| 2015/0015796 A1* | 1/2015 | Stahl | ................... | H04N 9/3179 348/745 |
| 2015/0046850 A1* | 2/2015 | Kurabayashi | ......... | G06F 3/1431 715/761 |
| 2015/0070247 A1* | 3/2015 | Kasahara | ........... | H04N 21/4222 345/1.1 |
| 2015/0261492 A1* | 9/2015 | Kawasaki | ............. | G06F 3/1423 345/2.1 |
| 2015/0268548 A1* | 9/2015 | Park | ....................... | G03B 21/28 353/30 |
| 2015/0309578 A1* | 10/2015 | McCoy | .................. | G06F 3/017 715/863 |
| 2016/0178905 A1* | 6/2016 | Rider | .................... | G06F 3/0489 345/8 |
| 2016/0202873 A1* | 7/2016 | Chi | ..................... | G06F 3/04815 345/173 |

* cited by examiner

PROJECTOR DEVICE, PORTABLE DEVICE AND WEARABLE PROJECTOR SYSTEM

FIELD

The subject matter herein generally relates to a projector device, a portable device, and a wearable projector system employing the projector device and the portable device.

BACKGROUND

Projectors are widely used in video meetings and product promotions. The projection technology is coupled to wearable device for conveniently use. However, it's difficult to stabilize a frame projected by the projector, since a wearable projector device may easily move with user's body.

BRIEF DESCRIPTION OF THE DRAWINGS

Many aspects of the disclosure can be better understood with reference to the following figures. The components in the figures are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
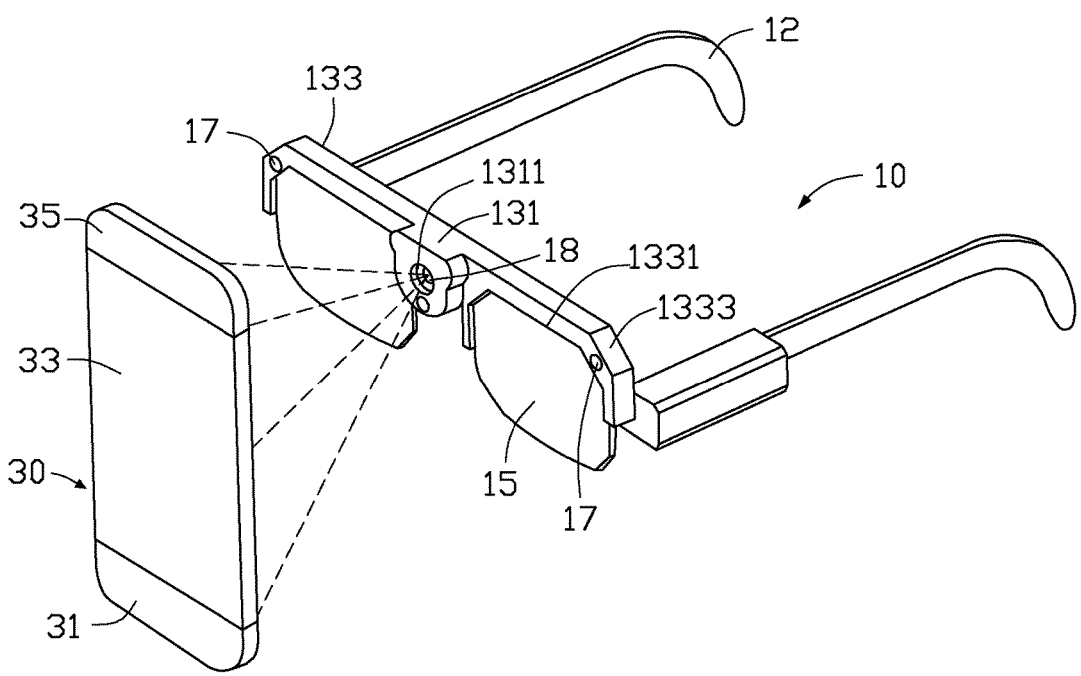
FIG. 1 is an isometric view of an exemplary embodiment of a projector device and a portable device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

Figure 3:
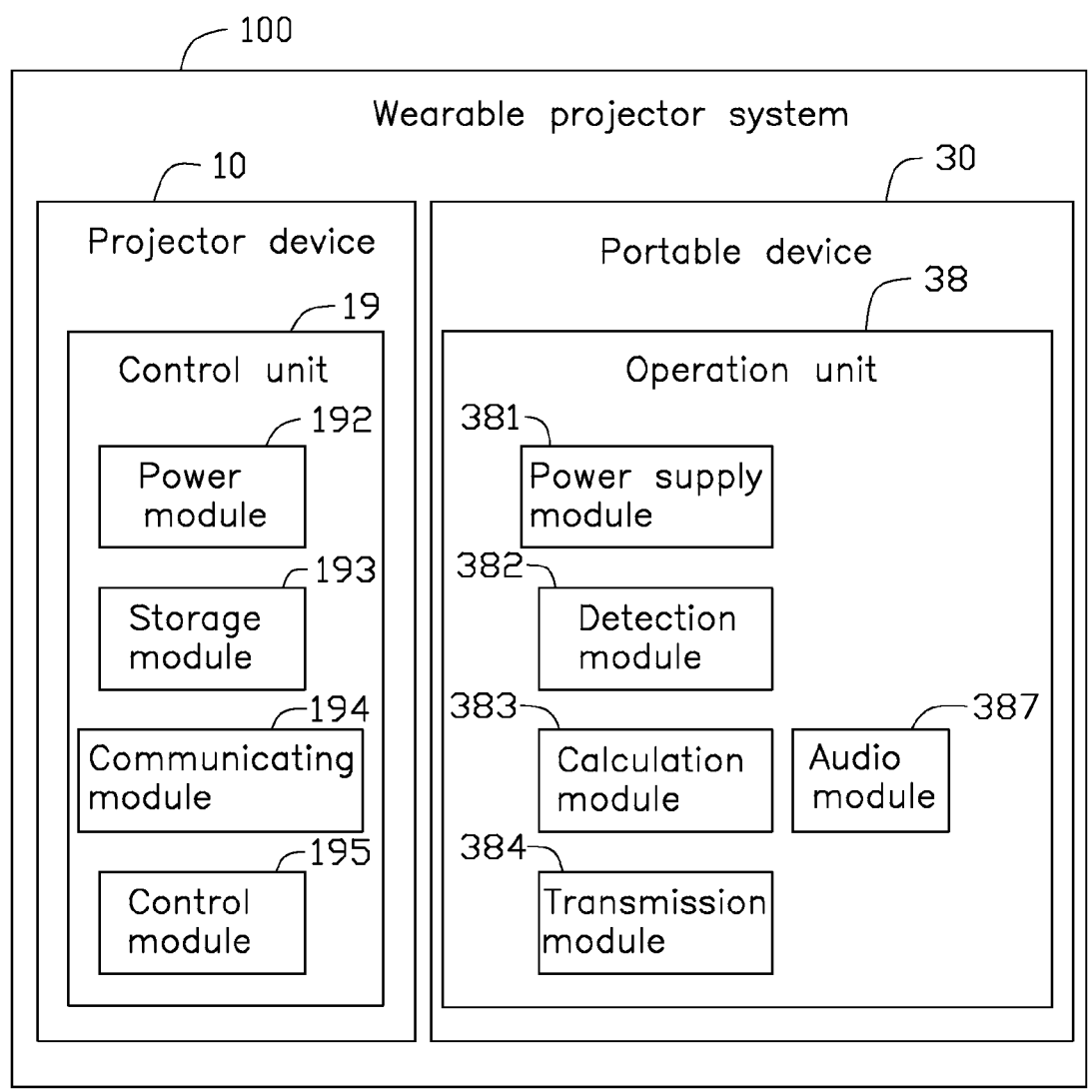
FIG. 3 is a block diagram of an exemplary embodiment of a wearable projector system.

FIGS. 1 and 3 illustrate an exemplary embodiment of a wearable projector system 100. The wearable projector system 100 includes a projector device 10 and a portable device 30. The projector device 10 is a wearable device, such as a helmet or a pair of glasses. The projector device 10 is configured to project frames to the portable device 30. The frames may include information, such as pictures, video, and cursor, etc.

Figure 2:
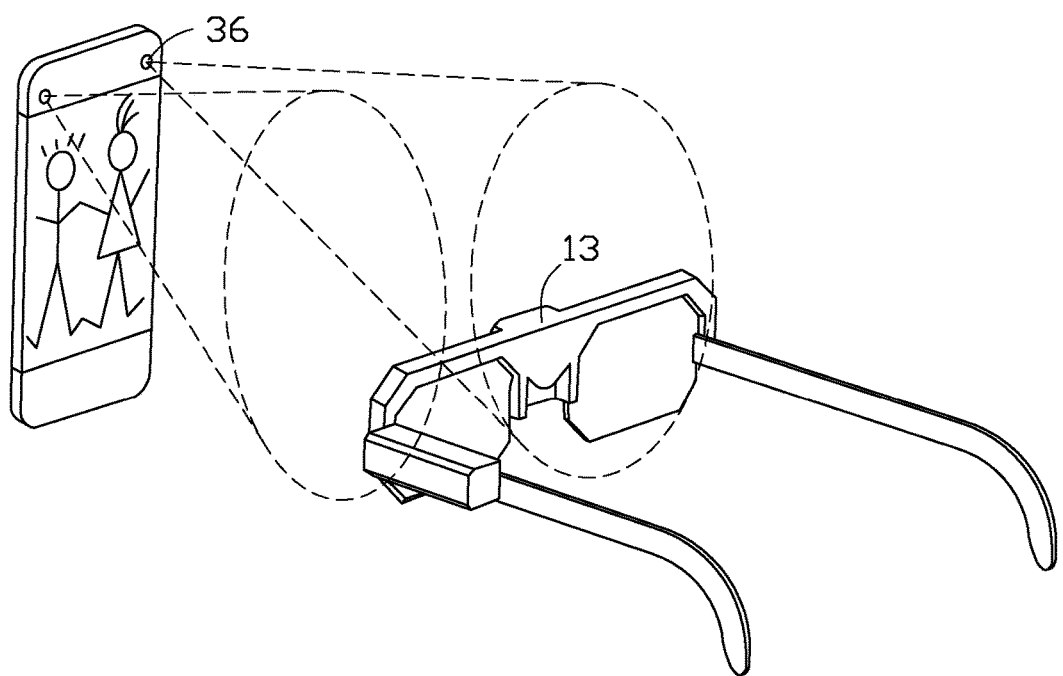
FIG. 2 is another isometric view of the projector device and the portable device of FIG. 1.

FIGS. 1, 2, and 3 illustrate that the projector device 10 includes two holding arms 12, a connecting piece 13 connected between the two holding arms 12, two glasses 15, a plurality of signal generators 17, a projector 18, and a control unit 19. The holding arms 12 are configured to be coupled to user's ears. The connecting piece 13 is substantially a frame and includes a receiving portion 131 in a middle portion and two mounting portions 133 connected to opposite sides of the receiving portion 131. The receiving portion 131 is configured to receive the projector 18 and defines a hole 1311. When the projector 18 is received in the receiving portion 131, the projector 18 is aligned with the hole 1311, thus lights generated by the projector 18 can emit out from the hole 1311.

Each of the mounting portions 133 is configured to mount one glass 15 and defines a mounting slot 1331 and forms a bent portion 1333 at an end away from the receiving portion 131. The mounting slot 1331 is configured to mount the glass 15. The signal generators 17 is configured to transmit wireless signals, infrared signals for example, to the portable device 30, therefore, the portable device 30 can determine a position of the projector device 10 related to the portable device 30. In at least one embodiment, the projector device 10 includes three signal generators 17, one of the three signal generators 17 is mounted to the receiving portion 131, the other two signal generators 17 are symmetrically mounted to the two bent portions 1333. The projector 18 is configured to project information, pictures and video for example, to the portable device 30.

The control unit 19 is electrically connected to the signal generators 17 and the projector 18. In at least one embodiment, the control unit 19 is mounted to the connecting piece 13. The control unit 19 includes a power module 192, a storage module 193, a communicating module 194, and a control module 195. The power module 192 is configured to supply power for the control unit 19, the signal generators 17 and the projector 18. The storage module 193 is configured to store the information and data. The communicating module 194 is configured to establish communication with the portable device 30 to exchange control signals. In at least one embodiment, the control signals include switching signals for actuating and disabling the signal generators 17 and projector 18, selecting signals for selecting projection contents, and operation signals for deleting and amending projection contents. The control module 195 is configured to respond to the switching signals to actuate and disable the signal generators 17 and projector 18, respond to the selecting signals to select projection contents, respond to the operation signals to delete or amend projection contents, adjust a projecting direction of the projector 18, and obtain projection contents from the storage module 193.

The portable device 30 is configured to receive projection contents, such as pictures, video, and cursor, etc, from the projector 18 and control the projector device 10. The portable device 30 includes a touch panel 31, a projection panel 33, a main body 35, a plurality of sensors 36, and an operation unit 38. The projection panel 33 is coupled to a middle portion of the main body 35. The touch panel 31 is coupled to an end of the main body 35 and configured to respond to a touch by the user and generate control signal, the operation unit 38 transmits the control signal to the projector device 10. The cursor on the projection panel 33 may move according to a movement on the touch panel 31. In at least one embodiment, the projection panel 33 is capable of reflecting and transmitting lights. User may see the projection contents on the projection panel 33 and the scene behind the projection panel 33 through the projection panel 33. The projection panel 33 can be made of semi-transparent glass with a cladding layer. The sensors 36 are coupled to the main body 35 opposite to the projection panel 33 and configured to detect the wireless signals transmitted by the signal generators 17.

The operation unit 38 is electrically connected to the touch panel 31, the projection panel 33 and the sensors 36. The operation unit 38 includes a power supply module 381, a detection module 382, a calculation module 383, a transmission module 384, and an audio module 387. The power supply module 381 is configured to supply power for the portable device 30. The detection module 382 is configured to detect the position of the signal generators 17 according to the sensors 36 to generate position signal, and further transmits the position signal to the calculation module 383. The calculation module 383 is configured to calculate a displacement of the projector device 10 related to the portable device 30, and further calculate an adjustment displacement and generate adjustment displacement signal. The transmission module 384 is communicated with the communication module 194 and configured to transmit the adjustment displacement signal to the communication module 194. The audio module 387 is configured to play audio. In at least one embodiment, the adjustment displacement signal is part of the control signal.

The wearable projector device 100 can operate as follows: when the projector 18 is projecting video signals, the signal generator 17 transmits wireless signals, infrared signal for example, in predetermined frequency. The sensors 36 detect infrared signal in the predetermined frequency and transmit position signal that representing positions of the signal generator 17 to the transmission module 384 when infrared signal is detected. The calculation module 383 calculates the displacement and adjustment displacement of the projector device 10 related to the portable device 30 according to the position signal to generate an adjustment displacement signal. The transmission module 384 transmits the adjustment displacement signal to the communication module 194. The communication module 194 transmits the adjustment displacement signal to the control module 195. The control module 195 controls the projector 18 to adjust a projecting direction and a projected frame shape of the projector 18, which provide a better browsing angle on the projecting panel 33 for the user, and therefore user can browse the projecting contents more comfortably.

The portable device 30 detects and calculates position of the projector 18 and corresponding adjustment displacement of the projector 18 related to the portable device 30. Therefore, the projector device 10 can accordingly adjust the projecting direction and the projected frame shape, which is convenient for being used.

It is believed that the embodiments and their advantages will be understood from the foregoing description, and it will be apparent that various changes may be made thereto without departing from the scope of the disclosure or sacrificing all of its advantages, the examples hereinbefore described merely being illustrative embodiments of the disclosure.

What is claimed is:

1. A projector device configured to communicate with a portable device, the projector device comprising:
   three signal generators configured to transmit wireless signals to the portable device;
   a projector configured to output projection contents;
   a control unit configured to communicate with the portable device;
   two holding arms configured to be coupled to a user's ears; and
   a connecting piece connected between the two holding arms and comprising a receiving portion in a middle portion and two mounting portions connected to opposite sides of the receiving portion, the receiving portion defining a hole, each of the mounting portions forming a bent portion at an end away from the receiving portion;
   wherein the projector is received in the hole and aligned with the hole, one of the three signal generators is mounted to the receiving portion, the other two signal generators are symmetrically mounted to the two bent portions; and
   wherein the portable device is configured to detect a position of the three signal generators and generate an adjustment displacement signal representing a displacement between the projector device and the portable device, and the control unit adjusts a projecting direction and a projected frame shape of the projector according to the adjustment displacement signal.

2. The projector device as claimed in claim 1, wherein the control unit comprises:
   a communication module configured to communicate with the portable device and receive the adjustment displacement signal from the portable device; and
   a control module configured to actuate and disable the signal generators and projector, select the projection contents, delete or amend the projection contents, and adjust the projecting direction of the projector.

3. The projector device as claimed in claim 2, wherein the control unit further comprises:
   a power module configured to supply power to the projector device; and
   a storage module configured to store the projection contents and the adjustment displacement signal.

4. The projector device as claimed in claim 1, wherein the projector device is a pair of glasses, the projector device further comprises two glasses coupled to the two mounting portions.

5. The projector device as claimed in claim 4, wherein each of the mounting portions defines a mounting slot, the mounting slot is configured to mount the glass.

6. A wearable projector system comprising:
   a projector device comprising:
      three signal generators configured to transmit wireless signals;
      a projector configured to output projection contents;
      a control unit;
      two holding arms configured to be coupled to a user's ears; and
      a connecting piece connected between the two holding arms and comprising a receiving portion in a middle portion and two mounting portions connected to opposite sides of the receiving portion, the receiving portion defining a hole, each of the mounting portions forming a bent portion at an end away from the receiving portion;
      wherein the projector is received in the hole and aligned with the hole, one of the three signal generators is mounted to the receiving portion, the other two signal generators are symmetrically mounted to the two bent portions;
   a portable device communicated with the projector device, the portable device comprising:

a plurality of sensors configured to detect a position of the three signal generators and generate a position signal; and an operation unit configured to determine an adjustment displacement of the projector device according to the position signal and generate an adjustment displacement signal representing a displacement between the projector device and the portable device;

wherein the operation unit transmits the adjustment displacement signal to the control unit, the control unit adjusts a projecting direction and a projected frame shape of the projector according to the adjustment displacement signal.

7. The wearable projector system as claimed in claim 6, wherein the control unit comprises:
   a communication module configured to communicate with the portable device and receive the adjustment displacement signal from the portable device; and
   a control module configured to actuate and disable the signal generators and the projector, select the projection contents, delete or amend projection contents, and adjust the projecting direction of the projector.

8. The wearable projector system as claimed in claim 7, wherein the control unit further comprises:
   a power module configured to supply power to the projector device; and
   a storage module configured to store the projection contents and the adjustment displacement signal.

9. The wearable projector system as claimed in claim 6, wherein the projector device is a pair of glasses, the projector device further comprises two glasses coupled to the two mounting portions.

10. The wearable projector system as claimed in claim 9, wherein each of the mounting portions defines a mounting slot, the mounting slot is configured to mount the glass.

11. The wearable projector system as claimed in claim 6, wherein the portable device further comprises a touch panel configured to respond to a touch by a user of the portable device and generate a control signal, the operation unit transmits the control signal to the projector device to select or edit projection contents of the projector device.

12. The wearable projector system as claimed in claim 11, wherein the portable device further comprises a main body and a projection panel, wherein the projection panel is coupled to a middle portion of the main body and configured to display the projection contents, the touch panel is coupled to an end of the main body, the sensors are coupled to another end of the main body.

13. The wearable projector system as claimed in claim 6, wherein the operation unit further comprises a detection module, a calculation module and a transmission module; the detection module is configured to detect the position of the signal generators according to the sensors to generate the position signal, and further transmits the position signal to the calculation module; the calculation module is configured to calculate a displacement of the projector device related to the portable device, and further calculate the adjustment displacement and generate the adjustment displacement signal; the transmission module is configured to communicate with the projector device and transmit the adjustment displacement signal to the projector device.

* * * * *